United States Patent
Dumov et al.

(10) Patent No.: US 9,883,411 B2
(45) Date of Patent: Jan. 30, 2018

(54) EXTERNAL CELLULAR RECOVERY DEVICE

(71) Applicant: Cisco Technology, Inc., San Jose, CA (US)

(72) Inventors: Leo Dumov, Los Gatos, CA (US); Jeslin Puthenparambil, San Jose, CA (US); Hari Pillai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 14/949,907

(22) Filed: Nov. 24, 2015

(65) Prior Publication Data

US 2017/0150378 A1 May 25, 2017

(51) Int. Cl.
*H04W 24/04* (2009.01)
*H04W 4/18* (2009.01)

(52) U.S. Cl.
CPC ............ *H04W 24/04* (2013.01); *H04W 4/18* (2013.01)

(58) Field of Classification Search
CPC .................................................. H04W 24/04
See application file for complete search history.

(56) References Cited

U.S. PATENT DOCUMENTS

| 6,108,300 A | 8/2000 | Coile et al. | |
|---|---|---|---|
| 6,173,333 B1 * | 1/2001 | Jolitz | H04L 29/06 |
| | | | 709/238 |
| 6,556,547 B1 * | 4/2003 | Srikanth | H04L 45/00 |
| | | | 370/317 |
| 7,852,773 B2 * | 12/2010 | Liu | H04L 41/046 |
| | | | 370/241 |
| 8,201,166 B2 * | 6/2012 | Garrett | G06F 9/455 |
| | | | 709/203 |

(Continued)

FOREIGN PATENT DOCUMENTS

| CN | 1863198 A | 11/2006 |
|---|---|---|
| CN | 202695905 U | 1/2013 |

(Continued)

OTHER PUBLICATIONS

Pigeon Point Systems—SHMM and CHMM Products (2004-2015) Can be seen at http://www.pigeonpoint.com/.

(Continued)

*Primary Examiner* — Noel Beharry
*Assistant Examiner* — Rodrick Mak
(74) *Attorney, Agent, or Firm* — Samuel M. Katz

(57) ABSTRACT

In one embodiment, a cellular recovery device includes an Ethernet physical transceiver to send and receive Ethernet frames, to and from, a remote host, respectively, via an Ethernet link, a cellular modem to send and receive cellular data packets, to and from a network, respectively, via a cellular communication system, and a central processing unit to receive a first control message originating from the remote host for the cellular recovery device to process the transfer of data between the Ethernet physical transceiver and the cellular modem, and process the transfer of data between the Ethernet physical transceiver and the cellular modem so that data may be transferred between a router/switch and the network via the cellular communication system. Related apparatus and methods are also described.

15 Claims, 3 Drawing Sheets

(56) References Cited

U.S. PATENT DOCUMENTS

| | | | |
|---|---|---|---|
| 8,653,965 B1* | 2/2014 | Otto | G08B 21/0453 |
| | | | 340/286.01 |
| 8,855,012 B1* | 10/2014 | Suri | H04L 12/2856 |
| | | | 370/254 |
| 9,094,330 B2 | 7/2015 | Takase et al. | |
| 2005/0152517 A1* | 7/2005 | Binder | H04L 12/66 |
| | | | 379/93.17 |
| 2006/0259933 A1* | 11/2006 | Fishel | G08B 13/19647 |
| | | | 725/105 |
| 2009/0222498 A1* | 9/2009 | Lu | G06F 17/30067 |
| 2010/0054132 A1* | 3/2010 | Mitsumori | H04L 41/00 |
| | | | 370/236.2 |
| 2010/0180161 A1* | 7/2010 | Kern | G06F 11/2028 |
| | | | 714/47.2 |
| 2013/0201316 A1* | 8/2013 | Binder | H04L 67/12 |
| | | | 348/77 |
| 2014/0269318 A1* | 9/2014 | Hasarchi | H04B 7/024 |
| | | | 370/235 |
| 2014/0269488 A1* | 9/2014 | Hedstrom | H05K 7/005 |
| | | | 370/315 |
| 2014/0334292 A1 | 11/2014 | Chang et al. | |

FOREIGN PATENT DOCUMENTS

| | | |
|---|---|---|
| JP | 201509675 A | 5/2015 |
| KR | 2007079272 A | 8/2007 |
| WO | WO2012171378 | 12/2012 |
| WO | WO2015106985 | 7/2015 |

OTHER PUBLICATIONS

Amplified Engineering, Out of Band Management and Monitoring of Remote Equipment and Device Web Server or Serial Console Using GPRS, Edge, 3G HSDPA or HSUPA (2004-2008) Can be seen at: http://www.amplified.com.au/application_out_of_band_management_console.aspx.

Cisco Systems, Inc.; Cisco Catalyst 6500 Virtual Switching System 1440Virtual Switching System (VSS) Q&A.

* cited by examiner

EXTERNAL CELLULAR RECOVERY DEVICE

TECHNICAL FIELD

The present disclosure generally relates to recovery of routing/switching functions.

BACKGROUND

Virtual routers, such as Cisco Cloud Services Router (CSR), can be hosted by generic server blades as well as by virtual routing platforms designed specifically to host a virtual router and provide built-in input/output (IO) and virtualized network interface cards (VNICs). A virtual routing platform is a hardware platform that runs one or more virtual machines (VMs). One of the virtual machines running on the virtual routing platform typically runs a virtual router, such as Cisco CSR and other VMs running on the virtual routing platform could run other services such as a firewall. The virtual routing platform typically runs a network functional virtualization operating system (NFVOS) and includes a baseboard management controller (BMC). A BMC is a specialized service processor that monitors the physical state of a computer, network server or other hardware device using sensors and communicates with the system administrator through an independent connection. The BMC is part of the Intelligent Platform Management Interface (IPMI) and is usually contained in the motherboard or main circuit board of the device to be monitored. The sensors of a BMC measure internal physical variables such as temperature, humidity, power-supply voltage, fan speeds, communications parameters and operating system (OS) functions.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention, a cellular recovery device, including a cellular modem to send a first plurality of cellular data packets to a network via a cellular communication system and to receive a second plurality of cellular data packets from the network via the cellular communication system, an Ethernet physical transceiver to send a first plurality of Ethernet frames to a remote host via an Ethernet link between the remote host and the cellular recovery device, receive a second plurality of Ethernet frames from the remote host via the Ethernet link, the remote host including a router/switch, and receive a first control message originating from the remote host for the cellular recovery device to process the transfer of data between the Ethernet physical transceiver and the cellular modem so that data may be transferred between the router/switch and the network via the cellular communication system, and a central processing unit to process the transfer of data between the Ethernet physical transceiver and the cellular modem so that data may be transferred between the router/switch and the network via the cellular communication system.

DETAILED DESCRIPTION

Figure 1:
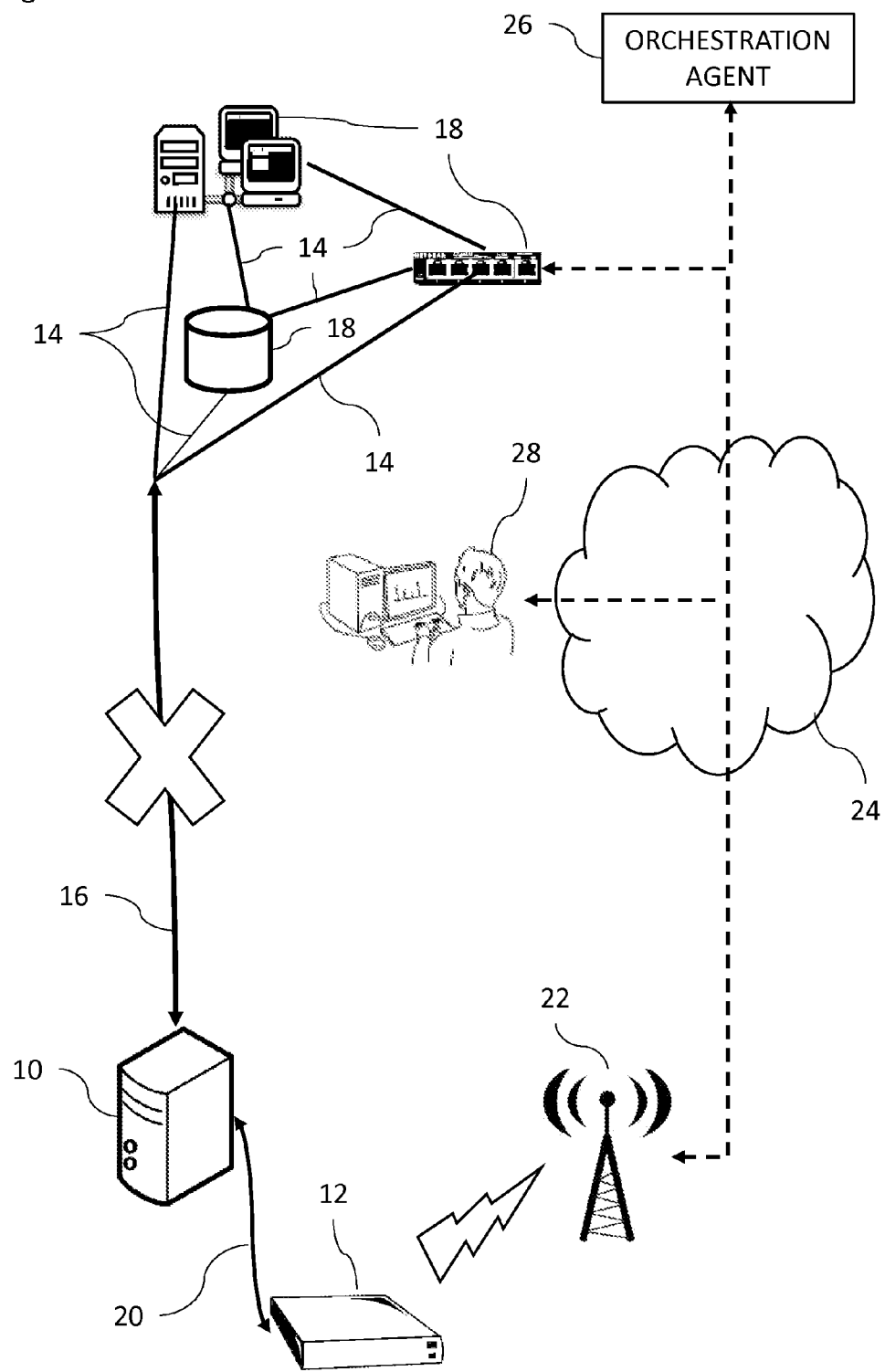
FIG. 1 is a partly pictorial, partly block diagram view of recovery of a remote host including a router/switch via a cellular recovery device constructed and operative in accordance with an embodiment of the present disclosure.

Reference is now made to FIG. 1, which is a partly pictorial, partly block diagram view of recovery of a remote host 10 including a router/switch via a cellular recovery device 12 constructed and operative in accordance with an embodiment of the present disclosure. The remote host 10 is a remote processing machine operationally connected to a network 14 via a suitable connection 16, for example, but not limited to an Ethernet Link or layer 2 switches. The network 14 may include a plurality of devices 18, virtual and/or non-virtual, for example, but not limited to, servers, storage, routers and switches. The remote host 10 is typically operationally connected via an Ethernet link 20 to the cellular recovery device 12. The cellular recovery device 12 includes cellular communication functionality for communicating with a cellular communication system 22, for example, but not limited to, a cellular WAN network via a 3G or Long term evolution (LTE), also known as a 4G connection, which in turn provides connectivity to the network 14 via the Internet 24. If the connection 16 to the network 14 fails, or for any other reason, the remote host 10 may be provided with connectivity to the network 14 using the cellular recovery device 12 via the cellular communication system 22 and then via the Internet 24. In addition to providing connectivity to the network 14, the cellular recovery device 12 may provide bootstrapping functions for the remote host 10 using an orchestration agent 26 as well as system recovery if the operating system (OS) of the remote host 10 is corrupted, or unavailable, via the aid of a remote operator 28. Recovery functions are described in more detail with reference to FIG. 2.

The router/switch typically includes a virtual router and/or a virtual switch on the remote host 10. The remote host 10 may be a server running a virtual router and/or virtual switch thereon. The remote host 10 may be a host machine running at least one virtual machine, one of the virtual machines in turn running a virtual router, by way of example only. The host machine may include a virtual routing platform to run the virtual machines. It will be appreciated that the remote host 10 may be replaced in certain embodiments by a machine running a non-virtual router and/or a non-virtual switch. The remote host 10 is "remote" in that it is remote from the cellular recovery device 12. The cellular recovery device 12 is typically external to the remote host 10. The remote host 10 and the cellular recovery device 12 are generally separate and different devices.

Figure 2:
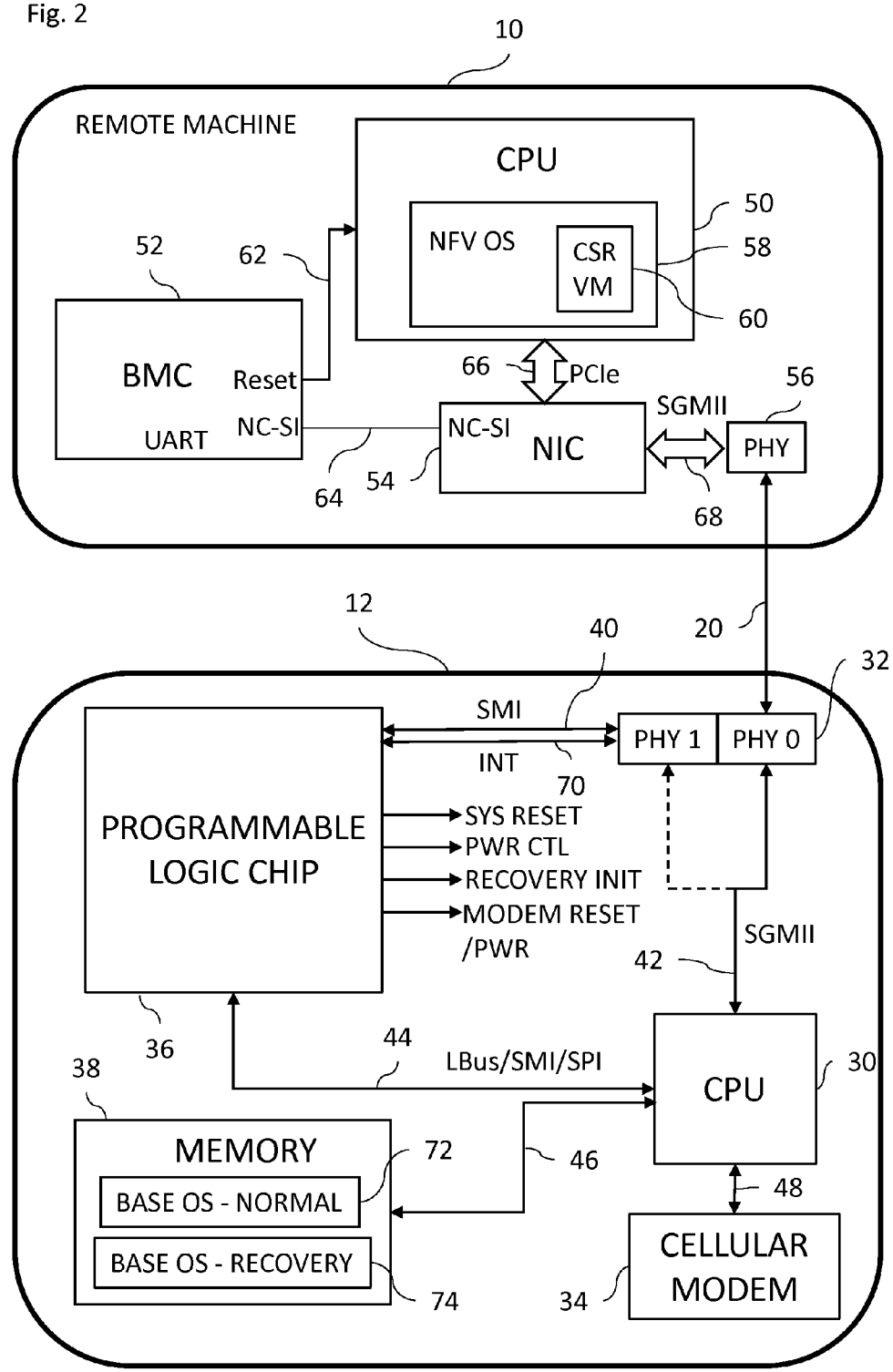
FIG. 2 is a block diagram view of the remote host and the cellular recovery device of FIG. 1.

Reference is now made to FIG. 2, which is a block diagram view of the remote host 10 and the cellular recovery device 12 of FIG. 1. The cellular recovery device 12 includes a central processing unit (CPU) 30, an Ethernet physical transceiver 32, a cellular modem 34, a programmable logic chip 36 and a memory 38. The Ethernet physical transceiver 32 is operationally connected to the programmable logic chip 36 via a connection 40, for example, but not limited to, a Serial Management Interface (SMI) or Serial Peripheral Interface (SPI). The Ethernet physical transceiver 32 is operationally connected to the CPU 30 via a connection 42, for example, but not limited to, a Serial Gigabit Media Independent Interface (SGMII). The programmable logic chip 36 is operationally connected to the CPU 30 via a connection 44, for example but not limited to a local bus (LBus) or SMI or SPI. The memory is operationally connected to the CPU 30 via a connection 46. The CPU 30 is operationally connected to the cellular recovery device 12 via a connection 48. The cellular modem 34 or cellular WAN (CWAN) interface is operative to send cellular data packets (not shown) to the network 14 (FIG. 1) via the cellular communication system 22 (FIG. 1). The cellular modem 34 or cellular WAN (CWAN) interface is operative to receive cellular data packets (not shown) from the network 14 (FIG. 1) via the cellular communication system 22 (FIG. 1). The network 14 assigns an IP address to the cellular recovery device 12. The Ethernet physical transceiver 32 may include a dual PHY chip including PHY 0 and PHY 1. The PHY chip may be any suitable dual PHY chip for example, but not limited to, a Gigabit Ethernet PHY chip. Alternatively, the functionality of PHY 0 and PHY 1, described in more detail below, may be incorporated into a single PHY chip. When the Ethernet physical transceiver 32 includes a dual PHY chip, one of the PHYs may be used for connectivity purposes to the remote host 10 including sending and receiving Ethernet frames, to and from, the remote host 10, respectively, via the Ethernet link 20 between the remote host 10 and the cellular recovery device 12 and the other PHY may be used for analysis purposes including parsing messages, for example, but not limited to, Ethernet Operations, Administration, and Maintenance (E-OAM) frames, coming from the remote host 10, described in more detail below. The Ethernet physical transceiver 32 may be powered on standby by a suitable power rail.

Other elements and functionality of the cellular recovery device 12 will be described in more detail below. However, the remote host 10 is now described in some more detail first. The remote host 10 includes a central processing unit (CPU) 50, a baseboard management controller (BMC) 52, a network interface card (NIC) 54 and an Ethernet physical transceiver (PHY) 56. The CPU 50 is operative to run a host operating system (OS) 58, for example, but not limited to, a network function virtualization (NFV) OS, which may run one or more virtual machines, one virtual machine (VM) running a virtual router or virtual switch (block 60), for example, but not limited to, Cisco CSR virtual router. The BMC 52 is connected to the CPU 50 via a connection 62. The BMC 52 is connected to the NIC 54 via a connection 64, for example, but not limited to, a Network Controller Sideband Interface (NC-SI). The CPU 50 is connected to the NIC 54 via a connection 66, for example, but not limited to, a Peripheral Component Interconnect Express (PCIe) connection. The NIC 54 is connected to the PHY 56 via a connection 68, typically a SGMII connection or a Quad Serial Gigabit Media-Independent Interface (QSGMII) or a Reduced Gigabit Media Independent Interface (RGMII), by way of example only. It will be appreciated that the different connections between the various components of the remote host 10 and the cellular recovery device 12 may use any suitable computer bus sending data according to any suitable data communication method and/or standard. It will be appreciated that the remote host 10 shown in FIG. 2 is a host machine running a virtual router. However, as described above with reference to FIG. 1, the remote host 10 may be replaced by a machine including a virtual switch or a non-virtual router or a non-virtual switch.

The BMC 52 is typically operative to detect if the connection 16 (e.g., WAN link) (FIG. 1) to the network 14 (FIG. 1) is down or if the CPU 50, the host operating system 58 and/or the VM is not operating. It will be appreciated that the BMC 52 may be replaced by other monitoring software and/or hardware. Based on the monitoring of the BMC 52, the BMC 52 is operative to prepare control message(s), for example, but not limited to, E-OAM frame(s), for sending to the cellular recovery device 12 to notify the cellular recovery device 12 about reset and recovery requests for the remote host 10. A control message may be prepared by the BMC 52 for sending to the cellular recovery device 12 for the cellular recovery device 12 to operate in "normal" mode or "recovery" mode. If a control message was prepared by the BMC 52 to operate the cellular recovery device 12 in "recovery" mode, once recovery has been performed, the BMC 52 may be operative to prepare another control message for sending to the cellular recovery device 12 for the cellular recovery device 12 to operate in "normal" mode, if necessary. The "normal" mode and "recovery" mode are described in more detail below. The reserved field in the E-OAM frame payload may be customized to carry information about the mode requests.

Pattern Matching

The Ethernet physical transceiver 32 is operative to receive one or more control messages, e.g., E-OAM frame(s) from the remote host 10. The Ethernet physical transceiver 32 may include a built-in analyzer (not shown) for example, but not limited to, a ternary Content-addressable memory (TCAM), to perform pattern matching of the received control message(s), e.g., E-OAM frames, arriving from the remote host 10. The built-in-analyzer is operative to match a pattern in each received control message to one or more predetermined patterns. The matching is performed to recognize commands from the BMC 52 of the remote host 10 to the cellular recovery device 12 about particular mode requests. A 4-byte reserved field in the E-OAM frame payload, by way of example only, may be used for encoding commands by the BMC 52. The matching process may include matching SA and/or DA and/or OAM fields within the E-OAM frame to the predetermined pattern(s). The CPU 30 may program signature/intervals for an analysis function of the Ethernet physical transceiver 32 to analyze the pattern matches.

The programmable logic chip 36 typically includes a plurality of programmable hardware logic gates. The programmable logic chip 36 may be embodied as a programmable logic device (PLD) or a field-programmable gate array (FPGA), by way of example only. The programmable logic chip 36 is operative to receive data (e.g., SPI/SMI port data) from the Ethernet physical transceiver 32 about a matching pattern in a received control message (e.g., an E-OAM frame) and issue a command or commands to perform one or more actions in the cellular recovery device 12 based on the matching pattern of that received control message. The data received by the programmable logic chip 36 from the Ethernet physical transceiver 32 may be based on the programmable logic chip 36 polling the Ethernet physical transceiver 32 or based on an interrupt (INT) signal (arrow 70) being generated and sent to the programmable logic chip 36 by the Ethernet physical transceiver 32 and then the programmable logic chip 36 interrogating the Ethernet physical transceiver 32 in response to receiving the interrupt signal (arrow 70).

The action(s) associated with the command(s) issued based on the pattern matching of the received control message may include one or more of the following: a system reset; a power control function; recovery initialization; and/ or modem reset. For example, if the pattern matching indicated that the BMC 52 was requesting "normal" mode then the actions may include: a system reset of the CPU 30 in "normal" mode; a power control function if the power an element of the cellular recovery device 12 is off; and/or modem reset or modem power cycle function of the cellular modem 34 if the cellular modem 34 was non-operational. If the pattern matching indicated that the BMC 52 was requesting "recovery" mode then the actions may include: a power control function if the power an element of the cellular recovery device 12 is off; recovery initialization of the CPU 30 in "recovery" mode; and/or modem reset or modem power cycle function. Therefore, the programmable logic chip 36 may issue the commands associated with the different actions to different elements of the cellular recovery device 12, for example, but not limited to, the CPU 30 and the cellular modem 34 based on the pattern matching of the received control message. The programmable logic chip 36 may also count the interrupt signals (arrow 70) and use them as keep alive notifications. The programmable logic chip 36 may provide an interface (for example, but not limited to, a local bus with general purpose input-output (GPIO) signals, inter-integrated circuit (I2C), SPI) for reading its registers to the CPU 30. In more detail, the programmable logic chip 36 typically sends an assert signal (interrupt or reset) to the CPU 30 or other logical element in the cellular recovery device 12. The CPU 30, or other logical element, then reads the registers of the programmable logic chip 36 or some other pin state of the programmable logic chip 36 in order to determine what action to perform. The CPU 30 may periodically query other elements in the cellular recovery device 12 based on the register readings. Alternatively, the programmable logic chip 36 may indicate the action in a signal sent to the CPU 30 or other element of the cellular recovery device 12.

It may be possible for the programmable logic chip 36 to obtain the state of the CPU 30 from a local bus and decide on recovery. The power states of the various elements of the cellular recovery device 12 may be monitored by the programmable logic chip 36 based on combining power feedback signals received by the programmable logic chip 36. The cellular modem 34 reset may be based on the CPU 30 issuing a reset to the programmable logic chip 36.

In order to protect the logic in the control messages sent by the BMC 52, the control messages may be protected by a suitable message security method, for example, but not limited to, a digital signature or message authentication code (MAC) or IEEE MAC Security standard (MACSec) which is a security method built-in to some PHY chips. The PHY 56 and the Ethernet physical transceiver 32 may include suitable hardware to manage the control message security. The Ethernet physical transceiver 32 may also verify the source MAC address of the control message to ensure that the received control message has been issued by the remote host 10.

Different Base Operating Systems

The memory 38 may include any suitable non-volatile memory, for example, but not limited to a flash memory. The memory 38 is operative to store therein a "normal" mode base operating system image 72 and a "recovery" mode base operating system image 74. The "normal" mode base operating system image 72 supports managing the transfer of data between the Ethernet physical transceiver 32 and the cellular modem 34 so that data may be transferred between the router/switch of the remote host 10 and the network 14 (FIG. 1) via the cellular communication system 22 (FIG. 1). The "recovery" mode base operating system image 74 supports recovery of a software failure in the remote host. In the "recovery" mode the cellular recovery device 12 interface to the remote host 10 generally only serves recovery needs and therefore generally does not need all the feature set included in the "normal" mode base operating system image 72.

The programmable logic chip 36 is operative to initiate the CPU 30 to load the "normal" mode base operating system image 72 or the "recovery" mode base operating system image 74 as the operating system running on the CPU 30 according to the matching pattern of the received control message as analyzed by the Ethernet physical transceiver 32. The CPU 30 loads the relevant image 72, 74 according to the pattern in the received control message.

In the "normal" mode, the CPU 30 of the cellular recovery device 12 is operative to process the transfer of data between the Ethernet physical transceiver 32 and the cellular modem 34 so that data may be transferred between the router/switch of the remote host 10 and the network 14 (FIG. 1) via the cellular communication system 22 (FIG. 1). The "normal" mode base operating system image 72 may include management functions, such as modem firmware upgrade, configuring modem data profiles and sending and receiving short message services (SMSs) and LTE quality of service over multiple bearers. The "normal" mode base operating system image 72 may support two cellular public data network (PDN) connections over a single physical cellular link. The features of the "normal" mode, such as providing one or more data paths between the virtual router and the devices 18 (FIG. 1) in the network 14, the management functions mentioned above, quality of service functions and cellular modem statistics are not generally supported by the host operating system 58. In the "normal mode" the virtual router controls the cellular recovery device 12 via command line interfaces (CLIs) that send messages and/or application program interfaces (APIs) to the cellular recovery device 12 over a management channel, for example, but not limited to, via a socket based connection over Ethernet.

The "recovery" mode base operating system image 74 once loaded by the CPU 30: (i) establishes connectivity between the BMC 52 on the remote host 10 and the network 14 (FIG. 1) via the cellular communication system 22 (FIG. 1) so that the remote operator 28 (FIG. 1) may manage the BMC 52 of the remote host 10 via the cellular recovery device 12. The IP address assigned by the network 14 to the cellular recovery device 12 is typically used by the remote operator 28 to manage the BMC 52; and/or (ii) establishes connectivity between the host operating system 58 running on the remote host 10 and the orchestration agent 26 (FIG. 1) via the cellular communication system 22 so that the orchestration agent 26 may perform bootstrapping functions for the VMs and/or routing/switching software on the remote host 10. The cellular recovery device 12 does not know whether recovery of the VMs and/or routing software is being performed or whether recovery of the BMC 52 is being performed. In "recovery" mode, the cellular recovery device 12 provides connectivity between the remote host 10 and the orchestration agent 26 and/or remote operator 28. In "recovery" mode, the cellular recovery device 12 typically provides one data path and typically does not provide the management function mentioned above and does not provide quality of service functions and cellular modem statistics. The "recovery" mode may include a single data link (PDN connection). The recovery mode typically does not include such as modem firmware upgrade, configuring modem data profiles and sending and receiving short messages services (SMSs) and LTE quality of service over multiple bearers.

The "recovery" mode base operating system image 74 may not be upgradeable in order to maintain reliability of the "recovery" mode base operating system image 74. The "normal" mode base operating system image 72 may be upgraded, as new features are added.

In the "normal" mode, connection from an external client/operator, such as the orchestration agent 26 or the remote operator 28, is typically possible to the virtual machines and/or router/switches (block 60). In the "recovery" mode, connection from an external client/operator, such as the orchestration agent 26 or the remote operator 28, is typically possible to the host operating system 58 and/or the BMC 52. As described above, the remote host 10 typically initiates recovery, and in recovery mode the cellular recovery device 12 transports packets between the remote host 10 and the network 14 and is typically unaware of the type of recovery and/or the content of the data being transferred between the remote host 10 and the network 14. The recovery type is handled by software in the remote host 10. As recovery is initiated by the remote host 10, hence, the remote host 10 establishes the connection with the destination relevant for the type of recovery; the cellular recovery device 12 is transparent to this. The recovery logic is implemented in the software of the remote host 10, which knows where the remote host 10 needs to connect to for different recovery functions. The external client/operator of the virtual machines and router/switches (block 60) may be different from, or the same as, the external client/operator for the host operating system 58 and the BMC 52.

The recovery type may depend on the failure occurring in the remote host 10. For example, if the failure is in the host operating system 58, the "recovery" mode establishes connectivity between the BMC 52 on the remote host 10 and the network 14 (FIG. 1) via the cellular communication system 22 (FIG. 1) so that the remote operator 28 (FIG. 1) may manage the BMC 52 of the remote host 10 via the cellular recovery device 12 and recover the host operating system 58. By way of another example, if the failure is in the virtual machines and/or router/switches (block 60) the recovery mode establishes connectivity between the host operating system 58 running on the remote host 10 and the orchestration agent 26 (FIG. 1) via the cellular communication system 22 so that the orchestration agent 26 may perform bootstrapping functions for the VMs and/or routing/switching software (block 60) on the remote host 10.

Recovery Mode then to Normal Mode

If the BMC 52 determines that the cellular recovery device 12 should boot in "recovery" mode, then the BMC 52 prepares a control message with data indicative of the "recovery" mode. By way of example, a control message may be handled using E-OAM frames, A 4-byte reserved field in the E-OAM frame payload, by way of example only, may be used for encoding commands by the BMC 52. The control message is received and analyzed by the Ethernet physical transceiver 32. The matching process may include matching SA and/or DA and/or OAM fields within the E-OAM frame to the predetermined pattern(s). According to the pattern in the control message: the programmable logic chip 36 is operative to initiate the CPU to load the "recovery" mode base operating system image 74 as the operating system running on the CPU 30; and the CPU 30 loads the "recovery" mode base operating system image 74.

Once recovery of the software failure in the remote host 10 has been completed, the BMC 52 may be operative to prepare another control message with data indicative of the "normal" mode. The Ethernet physical transceiver 32 is operative to receive that control message from the remote host 10 and the built-in analyzer of the Ethernet physical transceiver 32 is operative to match a pattern in that control message to a predetermined pattern. The programmable logic chip 36 is operative to: receive data from the Ethernet physical transceiver 32 about a matching pattern in that control message; and initiate the CPU 30 to reset and load the "normal" mode base operating system image 72 as the operating system running on the CPU 30 according to a pattern in that control message. The CPU 30 loads the "normal" mode base operating system image 72. Alternatively, once recovery of the software failure in the remote host 10 has been completed, the BMC 52 may be operative to prepare another control message with data indicative of that the cellular recovery device 12 may be shut down or placed in standby mode.

Figure 3:
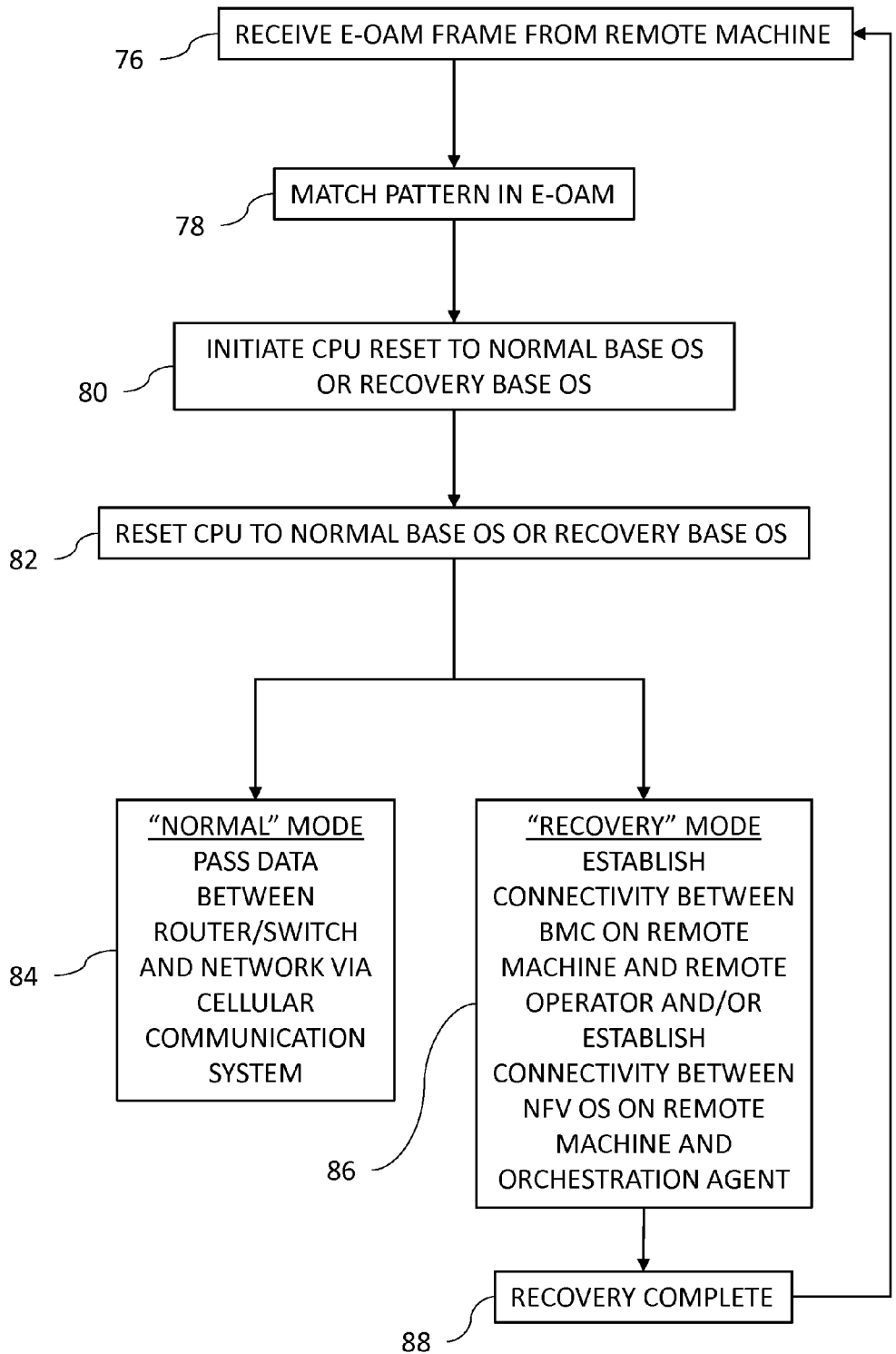
FIG. 3 is a flow chart showing an exemplary method of operation of the cellular recovery device of FIG. 2.

Reference is now made to FIG. 3, which is a flow chart showing an exemplary method of operation of the cellular recovery device 12 of FIG. 2. Reference is also made to FIG. 2. The Ethernet physical transceiver 32 of cellular recovery device 12 is operative to receive a control message (e.g., E-OAM frame) from the remote host 10 (block 76). The Ethernet physical transceiver 32 is operative to match a pattern in the received control message to a predetermined pattern (block 78). Based on a result of the matching, the programmable logic chip 36 is operative to initiate CPU reset of the CPU 30 to the "normal" mode base operating system image 72 or the "recovery" mode base operating system image 74 (block 80). The CPU 30 is reset to the "normal" mode base operating system image 72 or the "recovery" mode base operating system image 74 (block 82). If the CPU 30 is reset to "normal" mode, the CPU 30 is operative to pass data between the switch/router of the remote host 10 and the network 14 (FIG. 1) via the cellular communication system 22 (FIG. 1) (block 84). If the CPU 30 is reset to "recovery" mode, the CPU 30 is operative to establish connectivity between the BMC 52 on the remote host 10 and the remote operator 28 (FIG. 1) and/or establish connectivity between the host operating system 58 on the remote host 10 and the orchestration agent 26 (FIG. 1) (block 86). Once recovery is complete (block 88), the cellular recovery device 12 may receive another control message from the remote host 10 instructing the cellular recovery device 12 to reset in "normal" mode.

In practice, some or all of the functions of the cellular recovery device 12 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A cellular recovery device, comprising:
    a cellular modem to send a first plurality of cellular data packets to a network via a cellular communication system and to receive a second plurality of cellular data packets from the network via the cellular communication system;
    an Ethernet physical transceiver to:
        send a first plurality of Ethernet frames to a remote host via an Ethernet link between the remote host and the cellular recovery device;
        receive a second plurality of Ethernet frames from the remote host via the Ethernet link, the remote host including a router/switch;
        receive a first control message originating from the remote host for the cellular recovery device to process the transfer of data between the Ethernet physical transceiver and the cellular modem;
        receive a second control message from the remote host; and
        match a first matching pattern in the second control message to a first predetermined pattern; and
    a central processing unit to process the transfer of data between the Ethernet physical transceiver and the cellular modem;
    a memory to store therein a first base operating system image and a second base operating system image, wherein:
        the first base operating system image supports managing the transfer of data between the Ethernet physical transceiver and the cellular modem; and
        the second base operating system image supports recovery of a software failure in the remote host; and
    a programmable logic chip including a plurality of programmable hardware logic gates, the programmable logic chip being operative to:
        receive data from the Ethernet physical transceiver about the first matching pattern in the second control message;
        issue a command to perform at least one action in the cellular recovery device based on the first matching pattern of the second control message;
        initiate the central processing unit loading the first base operating system image or the second base operating system image as an operating system running on the central processing unit according to the first matching pattern of the second control message;
        initiate the central processing unit loading the second base operating system image as the operating system running on the central processing unit according to the first matching pattern in the second control message, wherein once recovery of the software failure in the remote host has been completed, the Ethernet physical transceiver is operative to: receive the first control message from the remote host; and match a second matching pattern in the first control message to a second predetermined pattern;
        receive data from the Ethernet physical transceiver about the second matching pattern in the first control message; and
        initiate the central processing unit resetting and loading the first base operating system image as the operating system running on the central processing unit according to the second matching pattern in the first control message.

2. The device according to claim 1, wherein the Ethernet physical transceiver includes a built-in analyzer to perform pattern matching.

3. The device according to claim 1, wherein the first control message and the second control message are Ethernet Operations, Administration, and Maintenance (E-OAM) frames.

4. The device according to claim 1, wherein the at least one action is selected from one or more of the following: a chip reset; a power control function; recovery initialization; or modem reset.

5. The device according to claim 1, wherein the second base operating system once loaded by the central processing unit establishes connectivity between a baseboard management controller (BMC) on the remote host and the network via the cellular communication system so that a remote operator may manage the BMC of the remote host via the cellular recovery device.

6. The device according to claim 1, wherein the second base operating system once loaded by the central processing unit establishes connectivity between a host operating system running on the remote host and an orchestration agent via the cellular communication system so that the orchestration agent may perform bootstrapping functions on the remote host.

7. The device according to claim 1, wherein the first control message and the second control message are prepared by a baseboard management controller (BMC) on the remote host for sending to the cellular recovery device.

8. The device according to claim 1, wherein:
    the central processing unit is operative to load the second base operating system image as the operating system running on the central processing unit according to the first matching pattern in the second control message;
    once recovery of the software failure in the remote host has been completed, the Ethernet physical transceiver is operative to receive the first control message from the remote host; and
    the central processing unit is operative to reset and load the first base operating system image as the operating system running on the central processing unit according to the second matching pattern in the first control message.

9. The device according to claim 8, wherein the first control message and the second control message are prepared by a baseboard management controller (BMC) on the remote host for sending to the cellular recovery device.

10. A cellular recovery method in a cellular recovery device, comprising:
    sending a first plurality of Ethernet frames to a remote host via an Ethernet link between the remote host and the cellular recovery device;

receiving a second plurality of Ethernet frames from the remote host via the Ethernet link, the remote host including a router/switch;

sending a first plurality of cellular data packets to the network via a cellular communication system;

receiving a second plurality of cellular data packets from the network via the cellular communication system;

receiving a first control message originating from the remote host for processing the transfer of data between the Ethernet physical transceiver and the cellular modem;

receiving a second control message from the remote host;

matching a first matching pattern in the second control message to a first predetermined pattern;

processing the transfer of data between the Ethernet link and the cellular communication system;

storing a first base operating system image and a second base operating system image, wherein:
  the first base operating system image supports managing the transfer of data between the Ethernet physical transceiver and the cellular modem; and
  the second base operating system image supports recovery of a software failure in the remote host;

receiving data from the Ethernet physical transceiver about the first matching pattern in the second control message;

issuing a command to perform at least one action in the cellular recovery device based on the first matching pattern of the second control message;

initiating loading the first base operating system image or the second base operating system image as an operating system according to the first matching pattern of the second control message;

initiating loading the second base operating system image as the operating system according to the first matching pattern in the second control message;

once recovery of the software failure in the remote host has been completed, receiving the first control message from the remote host and matching a second matching pattern in the first control message to a second predetermined pattern;

receiving data about the second matching pattern in the first control message; and initiating resetting and loading the first base operating system image as the operating system which is running according to the second matching pattern in the first control message.

11. The method according to claim 10, wherein the first control message and the second control message are Ethernet Operations, Administration, and Maintenance (E-OAM) frames.

12. The method according to claim 10, wherein the at least one action is selected from one or more of the following: a chip reset; a power control function; recovery initialization; or modem reset.

13. The method according to claim 10, wherein the second base operating system once loaded establishes connectivity between a baseboard management controller (BMC) on the remote host and the network via the cellular communication system so that a remote operator may manage the BMC of the remote host via the cellular recovery device.

14. The method according to claim 10, wherein the second base operating system once loaded establishes connectivity between a host operating system running on the remote host and an orchestration agent via the cellular communication system so that the orchestration agent may perform bootstrapping functions on the remote host.

15. The method according to claim 10, wherein the first control message and the second control message are prepared by a baseboard management controller (BMC) on the remote host for sending to the cellular recovery device.

* * * * *

UNITED STATES PATENT AND TRADEMARK OFFICE
CERTIFICATE OF CORRECTION

PATENT NO. : 9,883,411 B2  
APPLICATION NO. : 14/949907  
DATED : January 30, 2018  
INVENTOR(S) : Dumov et al.

Page 1 of 1

It is certified that error appears in the above-identified patent and that said Letters Patent is hereby corrected as shown below:

On the Title Page

Foreign Patent Documents, Column 2, Line 2, "CN202695905U" to read as -- CN202696905U --.

Other Publications, Column 2, Line 2, "at" to read as -- at: --.

On Page 2, Other Publications, Column 1, Line 1, "Engineering," to read as -- Engineering; --.

Signed and Sealed this
Tenth Day of April, 2018

Andrei Iancu
*Director of the United States Patent and Trademark Office*